United States Patent [19]

Yee

[11] Patent Number: 5,417,851
[45] Date of Patent: May 23, 1995

[54] PORTABLE APPARATUS FOR REMOTELY FILTERING CONTAMINATED LIQUIDS FROM A VARIETY OF MACHINERY RESERVOIRS BY CONTINUOUS RECYCLING

[76] Inventor: Skipper K. Yee, 14 W. Yorkshire Dr., Stockton, Calif. 95207

[21] Appl. No.: 236,582

[22] Filed: May 2, 1994

[51] Int. Cl.⁶ .................. B01D 29/48; B01D 27/07; B01D 27/08
[52] U.S. Cl. ........................ 210/167; 210/168; 210/196; 210/232; 210/238; 210/241; 210/416.1; 210/416.5; 210/443; 210/450; 210/497.1
[58] Field of Search ............... 210/241, 416.1, 416.5, 210/232, 167, 168, 196, 238, 440, 443, 450, 497.1

[56] References Cited

U.S. PATENT DOCUMENTS

| 3,759,388 | 9/1973 | Thomason . |
| 3,880,757 | 4/1975 | Thomason . |
| 4,366,057 | 12/1982 | Bridges . |
| 4,591,434 | 5/1986 | Prudhomme ............. 210/117 |
| 4,702,827 | 10/1987 | Wenzel . |
| 4,792,397 | 12/1988 | Rasmussen . |
| 4,959,144 | 9/1990 | Bernard . |
| 5,080,791 | 1/1992 | Sims . |

FOREIGN PATENT DOCUMENTS 534420 12/1956 Canada .

Primary Examiner—Thomas M. Lithgow
Attorney, Agent, or Firm—Basil Travis

[57] ABSTRACT

A portable filtering apparatus with improved canister and filter cartridge design is described for remotely filtering by continuous recycling a variety of solvents and lubricating fluids from machinery reservoirs without requiring the halting of machinery operation or need for emptying said reservoirs to replace the solvents or fluids therein, said filter cartridge being replaceably removable from the canister for complete disposal along with its trapped contaminates preferably by incineration.

3 Claims, 3 Drawing Sheets ns
PORTABLE APPARATUS FOR REMOTELY FILTERING CONTAMINATED LIQUIDS FROM A VARIETY OF MACHINERY RESERVOIRS BY CONTINUOUS RECYCLING

BACKGROUND OF THE INVENTION

1. Field of The Invention

The present invention generally relates to a portable apparatus for removing and remotely filtering contaminated liquids or dirty cleaning fluid solvents and then returning by continuous recirculation or recycling the resulting clean liquids and solvents to reservoirs of machinery, such as internal combustion engines and industrial parts washers, without need for completely emptying said liquid from the machinery reservoir.

More particularly, the present invention pertains to a portable apparatus comprising a motor, pump and flexible conduit hose arrangement in communication with a specially designed filtering cartridge within a filtering canister for remotely withdrawing said contaminated liquids and solvents from a .machinery reservoir and forcing by pressure the fluid through said remote filtering canister which provides for collection of dirt, grit, soil, grease and particulate matter within the canister filtering cartridge, and thereby further allowing clean liquid or fluid solvent to be continuously returned by recycling to a machinery liquid reservoir while said machinery is either being used, or without emptying the liquid therefrom, and thereby circumventing any need to halt an industrial production line activity or transfer dirty fluids to a storage tank for mere cleaning and replenishing of the liquid or fluid solvent therein.

Even more specifically, the present invention deals with an improved arrangement of a coiled fibrous filtering cartridge, preferably of cellulose, positioned within its filtering canister which has been specifically designed to work on an "reverse vertical-flow" principle to maximize surface area contact between the filtering cartridge and a variety of contaminated liquids and solvents commonly used in modern machinery, refrigeration, air-conditioning, food processing and even highly corrosive non-aqueous toxic cleaning fluids in industrial parts washers.

The portability of the hereinafter described apparatus of the present invention, along with its versatility for providing continuous cleaning by recycling a variety of contaminated liquids and toxic solvents through an improved filtering cartridge within its improved canister design, is believed to be an advantage over the prior art.

2. Description of The Prior Art As it is perhaps well known, modern industrial machinery, internal combustion engines, electrical equipment, food processing apparatus and parts washers, often utilize a variety of liquids or solvents for the purpose of lubrication, heat transfer and cleaning which can range from common motor oil for lubrication in an automobile engine to toxic chlorinated hydrocarbons in a parts washer for cleaning electronic semi-conductor components. These non-aqueous liquids and solvents with use over time become dirty and contaminated with dirt, grime, grease, grit and particulate matter and need to be replaced by clean fluids.

In bygone years, and before enactment of present environmental regulations, it was not uncommon to find that dirty and contaminated non-aqueous liquids, solvents and their cleaning fluid mixtures were merely disposed of in a sanitary sewer, or, for that matter, simply dumped on the ground. However such practice today is clearly unacceptable, if not unlawful.

Today, one method of disposing of non-aqueous liquids and fluid solvents involves their total removal and transportation to a disposal site, which is very inconvenient and expensive to say the least, but, moreover, there is an additional environmental concern that such toxic dump sites are fast becoming overwhelmed with waste. Accordingly, any means of prolonging the life efficiency of said liquids and fluids would be of both economic and environmental importance.

Another approach to the present problem of disposing of dirty and contaminated non-aqueous liquids or fluid solvents is by remediation. That is to say, that the fluid is removed and collected from a machinery reservoir for transport to a chemical distillation and recovery plant where the fluids are separated, purified and resold. The impurities, when separated and rendered harmless, are then disposed of normally.

Of course, disposal costs whether by lawful dumping or remediation are but one major consideration in any industrial application, since there is always additional down-time of machinery or a production line while any fluids are removed from their reservoirs and replenished, and it only follows than any innovation or technique which can prolong life of these fluids or allow for their remediation without emptying their reservoirs would have a positive economic benefit to that industry in the form of lower costs, less down time, and, perhaps an additional bonus for the environment.

The prior art reveals descriptions of external filtering apparatus and filter canister arrangements for specific purposes, but none are known to provide the combined benefits of the present invention.

For example, in U.S. Pat. No. 4,591,434 (1986), Prudhomme describes a remote dual filtering apparatus for filtering and purifying contaminated oil used in deep-fat fryers. His presumably portable apparatus generally comprises a remote tub divided into an upper and lower section, said upper section containing a canister filter in communication with a flexible conduit through which oil from an external fat fryer is conveyed by a pump through said canister filter and into the bottom portion of his tub for accumulation therein and thereby draining the fat fryer. The cleansed oil may be then returned to the fat fryer by reversing flow of the pump.

Although it would appear at first glance that the Prudhomme apparatus employs the same principle as the present invention, it should be pointed out that Prudhomme requires complete drainage of the external fat fryer reservoir and accumulation in its lower tub-section while the present invention provides for continuous circulation and recycling of a remote reservoir fluid thereby obviating any need to drain the reservoir, which is believed to be one major improvement over the prior art.

Moreover, the filtering canister arrangement of Prudhomme performs oppositely of the present invention in that the direction of his fluid flow is upwardly through the filter cartridge, while fluid flow of the present invention is downwardly through the filtering cartridge or a "reverse vertical flow" which is believed another improvement to minimize a common problem of fluid "channeling" known to occur in other prior art filtering apparatus.

As a further example of prior art filtering canister arrangements, in U.S. Pat. No. 4,869,820 (1989), I last described an axial or "opposed-flow" filtering apparatus composed of co-axially stacked coiled rolls of filtering paper separated by a screened conduit for axially directing fluid flow from the interior of the filter cartridges inwardly to an outlet means and thereby improving upon control of flow with respect to previous art employing single paper roll filter cartridges and filtering canisters as described in U.S. Pat. Nos. 4,575,422; 3,572,509; 3,481,478; 3,319,790. Although my improved dual "opposed" or axial flow filter apparatus also preferably utilized common tissue paper rolls for filtration of automotive oil as did the other aforementioned single roll filters, none of these filter cartridges nor canister designs were found to be satisfactory for filtering a wide range of non-aqueous liquids and solvents with different viscosities and even some with reactivity to the paper filter cartridge itself. In other words, the known prior art filtering apparatus, filtering cartridges and their canister arrangements have all been designed to accommodate a particular and specific kind of liquid, rather than a broad range of liquids with different viscosities and chemical reactivity. This difference is believed to be a major advantage of the present invention over the prior art.

As yet one further comparison, with respect to known prior art non-aqueous filtration systems, concerns application of the present invention to cleaning fluid solvents in industrial parts washers, such as those described in U.S. Pat. No's. 3,890,988 and 3,378,988. Because these parts washers can be employed to clean a variety of industrial parts ranging from greasy automobile parts to electronic semi-conductor components, it is also easily seen that they may also utilize a wide range of solvents having different physical and chemical properties other than those of automotive lubricating oil. In fact, solvents most widely used as cleaning fluids in parts washers today are chosen from any group of chlorinated hydrocarbons (such as carbontetrachloride and trichloromethane), fluorinated hydrocarbons (such as the FREONS), petroleum distillates (such as petroleum ethers), aromatic hydrocarbons (such as toluene and naptha), ketones (such as acetone), alcohols (such as methanol), and proprietary mixtures thereof. Thus, the prior art filtering apparatus have not addressed remote filtration and continuous recycling of a variety of non-aqueous contaminated liquids and toxic solvents with different viscosities and with regard to efficiency of the filtering cartridge.

For example, it is well known that viscosity is that physical property of a liquid giving it resistance to flow, at a particular temperature, and often measured in centipoises (cp) with common automotive motor oils having a viscosity of approximately 30 cp and acetone of approximately 0.3 cp at 20 degrees centigrade. Therefore, any apparatus for remotely filtering and continuous recycling of contaminated liquids in a variety of machinery should be able to accommodate a wide range of liquids with viscosities ranging over 100 cp. Moreover, the prior art apparatus previously cited does not address any adverse chemical reaction between said various fluids and previously described paper tissue roll filters, some of which are known to be degraded and destroyed or exhibit channeling therein by contact with non-compatible solvents.

Accordingly, it is a General object of the present invention to provide a portable apparatus for remotely filtering contaminated liquids from a variety of machinery reservoirs by continuous recycling or recirculation of the liquid between said reservoir and apparatus without need to completely drain the reservoir.

It is another object of the present invention to provide an improved coiled fibrous cellulose filtering cartridge in combination within an improved filter canister design for specifically and efficiently filtering a variety of contaminated liquids having viscosity ranging from 0.3 to 40 centipoise at 20 degrees centigrade, while withstanding chemical attack by caustic and toxic solvents.

These and other advantages are achieved by the present invention.

SUMMARY OF THE INVENTION

In accordance with the present invention, a portable apparatus for remotely filtering contaminated liquids from a variety of machinery reservoirs by continuous recycling or recirculation is provided.

Briefly, the apparatus of the present invention comprises a portable stand, such as a hand truck, to which is mounted for portability a motor, pump, and filtering canister with internal filtering cartridge, said filtering canister being in attached fluid communication with at least two flexible conduit hoses of sufficient length and arrangement so that one said hose being an intake hose is of sufficient length for attachment to and communication with said pump thereby allowing manual manipulation of a distal end of said intake hose to be placed into a machinery liquid reservoir.

The pump, providing both suction at its inlet end and positive pressure its outlet end, causes liquid from a machinery reservoir to enter the distal end of said connected intake hose by suction and travel through said pump to its outlet where said liquid is further forced by positive pressure of the pump and through a proximal portion of said connected intake hose into the filtering canister by way of an entrance port in the canister's base plate.

The filtering canister may be further briefly described as an elongated hollow cylinder having a lower base plate and removable circular lid. The lid is essentially cross-sectionally dome-shaped with annular and downwardly projecting skirt which slideably fits into the interior of said canister and contiguously abuts its inner wall while also engaging and pressing against the top of an installed but removable filtering cartridge to form a chamber or hollow cavity within the dome area of the lid.

An outer circumferential shoulder around the lid's circumference defines an annular groove between said skirt and shoulder for retention of a gasket, all of said which tightly engages the canister's top rim when the lid is installed.

Attached stationarily to the interior center of the lid and projecting downwardly perpendicularly and coaxially through the center of the canister when said lid is installed is a hollow intake tube, removably attached at its threaded bottom portion with a threads of the inlet port in the base plate of the canister, so that when the lid is placed on the canister top and turned clockwise the threads of said intake tube engage the threads of said inlet port in the canister base thereby forcing the lid downwardly upon the canister top where the skirt of the lid is slidingly mounted within and abuts the internal wall of the canister, while also tightly pressing upon the circumferential top portion of said removable filtering cartridge thereby providing a hollow chamber or cavity in the dome area of the canister lid which in turn results in a pool of pressurized liquid positioned over the top of said filtering cartridge, under pressure of the pump, when the present invention is in use. This particular feature is believed to be one major improvement over the prior art because the pressurized pool of contaminated liquid in the canister's top provides uniform downwardly percolating flow of liquid through the filtering cartridge by controlling pump pressure as required to accomplish flow of contaminated liquids of varying viscosities.

The filtering cartridge may be further briefly described as a coiled continuous sheet of fibrous cellulose element wound tightly around a hollow cylindrical core, resembling not unlike a roll of common toilet tissue, but with the exception in that said coil element is encapsulated within a preferably linen sock or bag capsule for holding said fibrous layered element together and thus giving said cartridge rigidity and strength during use and removal from the canister. The filtering cartridge, being replaceably installed in the canister is suspended within its proximate center upon a spindle for easy insertion into and removal from the canister after use and for subsequent preferred disposal by burning.

The canister spindle, while providing support for the filtering cartridge while in the canister, comprises a basic framework of a hollow shaft extending vertically upwardly and perpendicularly from its circular base plate which contains a plurality of orifices to allow drainage of cleaned liquid from the bottom of the filtering cartridge through a wire screen mounted upon the spindle's circular base plate, said screen which simply in turn provides for increased axial liquid flow to said orifices. A notch in the upper portion of the spindle's hollow shaft allows a dirty filtering cartridge to be easily removed from the filtering canister by simply pulling the spindle with cartridge attached out of the canister by the human fingers.

As contaminated liquid enters the canister's internal hollow cavity above the filtering cartridge by way of inlet orifices located near the top of said hollow intake tube, the liquid quickly fills the cavity and becomes pressurized by the running pump, the speed of which may be regulated for accommodation of various liquid viscosities to force said liquid through the filtering cartridge and downwardly to the bottom of the filtering canister and through the canister exit port for return to said machinery liquid reservoir by an attached return hose, thereby completing the task of remotely filtering contaminated liquids by continuous recirculation or recycling.

DETAILED DESCRIPTION OF THE PREFERRED EMBODIMENT

Before turning to the drawings, a brief word need be said about viscosities of liquids in relation to the present invention, because those skilled in the art will quickly realize that temperature of a liquid is inversely proportional to its viscosity so that the present invention, like those filtering apparatus of the prior art, is constructed and designed to operate with liquids of room temperatures customarily encountered in the workplace, but, however, it would be within the scope and spirit of the present invention to provide means also known in the art to control liquid temperature external or internal of the present invention for its successful and efficient operation, for example by use of a simple heater.

Moreover those skilled in the art may also realize that contaminated liquids in machinery reservoirs are often grossly contaminated with debris and particulate matter thereby requiring prefiltering, such as described by Prudhomme in U.S. Pat. No. 4,591,434, which may be necessary for use in conjunction with practice of the present invention in some situations like with use for cooking oils.

Figure 1:
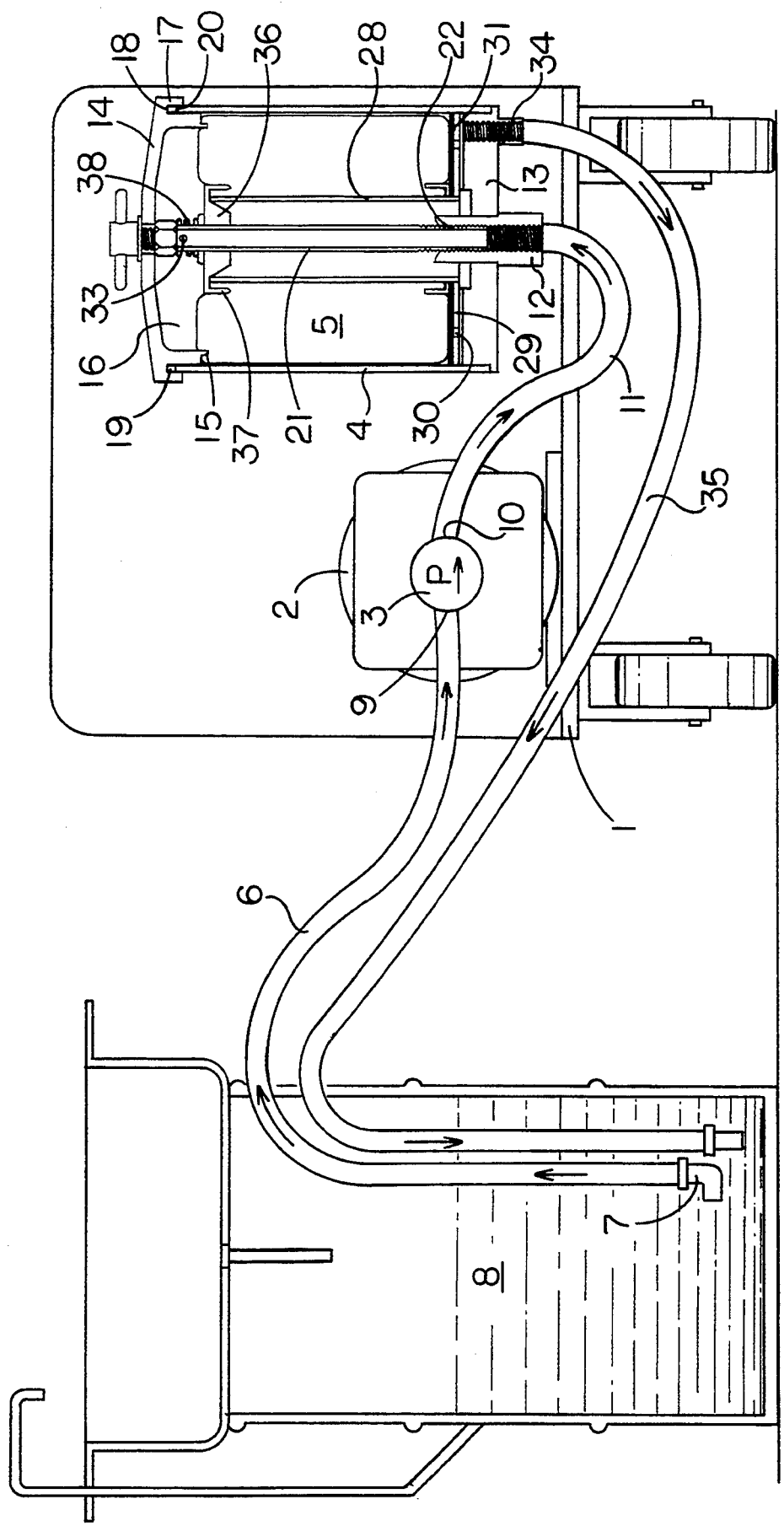
FIG. 1 is a cross-sectional elevational view which schematically and diagrammatically illustrates the overall operation of the present invention in use with a typical liquid reservoir of a parts washer.

Having these caveats in mind and referring to the drawings, FIG. 1 is a cross-sectional schematic view illustrating the practice of the present invention in conjunction with contaminated liquid in a typical machinery reservoir 8, said reservoir depicted therein as a simplified parts washer as commonly found in machine and auto repair shops, however said reservoir 8 could have just as easily been shown to be of more sophisticated construction, but for purposes of illustration it is only necessary to point out that the reservoir 8 have some means of access for a flexible conduit intake hose 6 and a return hose 35. It should also go without saying that exact positioning of said hoses 6 and 35 in the reservoir 8 as illustrated in FIG. 1, wherein a distal end 7 is shown positioned above an end of the return hose 35, is not required for successful operation of the present invention but only represents one preferred hose positioning to enhance circulation in this particular configuration of a reservoir 8.

Nor are any particular lengths and sizes of said hoses 6 and 35 critical to practice the invention, but the physical and chemical composition of the said hoses should be composed of sufficient material to withstand suction and pressure caused by the force of a pump 3, and said hoses should be of composition to resist chemical attack of a particular solvent or liquid in the reservoir 8. For example, a rubber hose may not be suitable for use with solvents known to attack rubber.

A flexible conduit intake hose 6, as shown in FIG. 1, is remotely connected by means known in the art with an inlet end 9 of a pump 3 which is attached to and turned by a preferably electric motor 2, however a gasoline engine may as easily as well be substituted under conditions where electricity is not readily available. Such motor 2 and pump 3 arrangements are commercially available in various sizes and capacities and many, especially gasoline engines, easily provide for control of pump speed. The precise size of the motor 2, the capacity of the pump 3, the lengths, sizes and composition of the hoses 6 and 35, should be understood to be dependent upon the nature and quantity of liquid being removed from and recycled into the reservoir 8, but in its preferred embodiment the present invention employs a TEEL Model 1P782 liquid pump attached to 1 h.p. electric motor capable of producing preferred positive pressure of between 20–30 p.s.i. at the pump's 3 outlet end 10 where there may be also conveniently placed (but not shown in the drawings) a pressure gauge.

The pump 3 and motor 2 of FIG. 1, and contiguous with a filtering canister 4, may be conveniently mounted upon a portable stand 1, such as a hand truck, for easy transportation to and from a machinery reservoir 8 and remote connection by flexible conduit hoses 6 and 35, thereto, and because of its portability the present invention can be used to clean several different kinds of machinery reservoirs without need to halt machinery operation to merely empty their reservoirs. As one example, where there might be a diesel-powered electric generator required to run continuously for production of electricity, it would be within the scope and spirit of the present invention to provide its intake hose 6 of sufficient rigid small diameter for insertion into the lubricating reservoir of said diesel engine by way of its "dip stick" opening for removal of the dirty lubricating oil while also inserting the return hose 35 into any "fill" reservoir orifice thereby providing said machine continuous cleaning by recycling of its lubricating fluid while the engine is in continuous operation.

Aside from several other possible applications and advantages of the present invention, and referring once again to FIG. 1, it can be seen that fluid communication between an outlet end 10 of a pump 3 and an entrance port 12 of filtering canister 4 is accomplished with a short length of a proximal portion 11 of intake hose 6, which needs to be distinguished in the drawings because said proximal portion 11 may be non-flexible steel pipe permanently and rigidly attached to an entrance port 12 of said canister 4, especially where pressures greater than 30 p.s.i. are produced by pump 3. Although it may be recalled that sizes, lengths and composition of said hoses may vary for each application, under normal pressure and suctional forces caused by the pump 3, the preferred hoses 6, 11 & 35 of the present invention are 0.5" o.d. TYGON tubing, which has been found satisfactory for practice of the present invention because this particular hose is flexible, corrosion resistant and does not collapse by suction nor burst by pressure up to and including 30 p.s.i. as measured at the pump's 3 outlet end 10.

Figure 2:
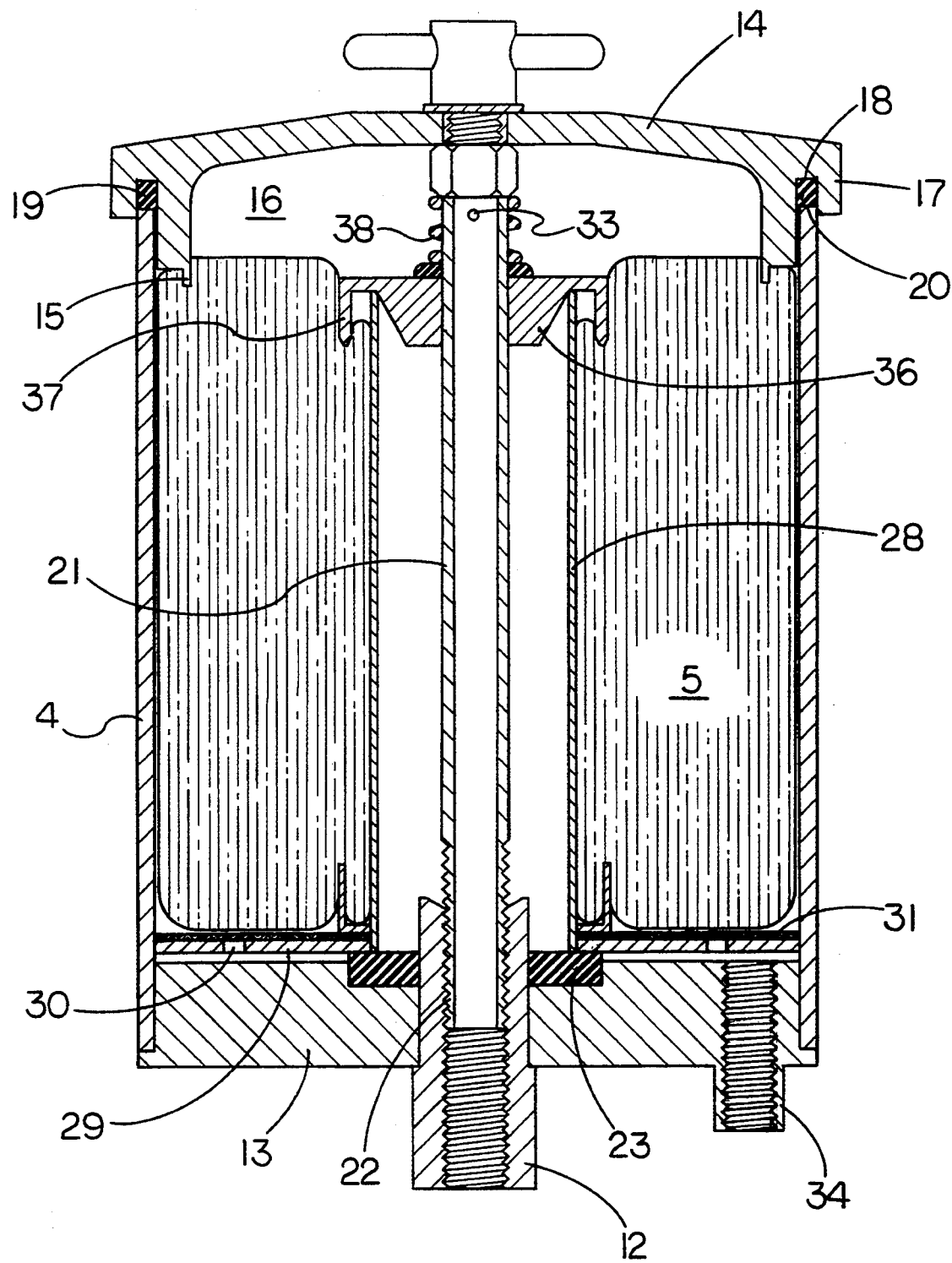
FIG. 2 is a cross-sectional view of the filtering canister with filtering cartridge in place.

The filtering canister 4, shown in cross-sectional detail in FIG. 2, is essentially an elongated hollow cylinder having a lower base plate 13 with internally threaded entrance port 12 and exit port 34. The canister's circular lid 14 is cross-sectionally dome-shaped to provide a hollow chamber or cavity 16 which is filled by pressurized liquid above a filtering cartridge 5 when the present invention is in use. It is felt that this feature is one improvement over known prior art canisters because the pressurized pool of liquid above a filtering cartridge provides uniform downwardly percolating flow thereby minimizing a common problem of channeling through a filter.

In order to maintain pressure in said cavity 16, the lid 14 has been specifically constructed, as best shown in FIG.'s 2 and 3, with an annular and downwardly projecting skirt 15 which slidingly fits into the interior of said canister 4 and abuts its inner wall while also engaging annularly and contiguously pressing against the top of an installed filtering cartridge 5. In .addition, the circumference of said lid 14 provides an outer circumferential shoulder 17 which defines an annular groove 18 between said shoulder 17 and skirt 15 for retention of a resilient gasket 19, all of which tightly engages the canister rim 20 when the lid 14 is installed, as illustrated in FIG.'s 1 and 2, said design of the lid 14 is believed to be one yet further advantage over the prior art canister lids because of its ability to withstand high pressures therein.

Attached stationarily to the interior center of the lid 14 and projecting downward perpendicularly therefrom and coaxially through the center of the canister 4 (FIG.'s 2 and 3), when the lid 14 is installed, is a hollow intake tube 21 removably attached at its threaded bottom portion 22 with threads of the canister's inlet port 12 so that when the lid 14 is placed upon the canister's rim 20 and said lid is turned clockwise thereon, the threads 22 of said intake tube 21 engage the threads of said inlet port 12 thereby forcing the lid 14 downwardly upon said rim 20 forming a tight seal. At least one inlet orifice 33 located near the top of said tube 21 provides entry of contaminated liquid into the canister's cavity 16 under pressure of pump 3 thereby resulting in a pool of pressurized liquid in the canister dome, said pressure causing a downward percolation of liquid through said filter cartridge 5 (see FIG. 2), said arrangement heretofore referred to as a reverse vertical-flow which should be distinguished from other filters known in the prior art which employ bottom-to-top or axial flow through their cartridges.

Figure 3:
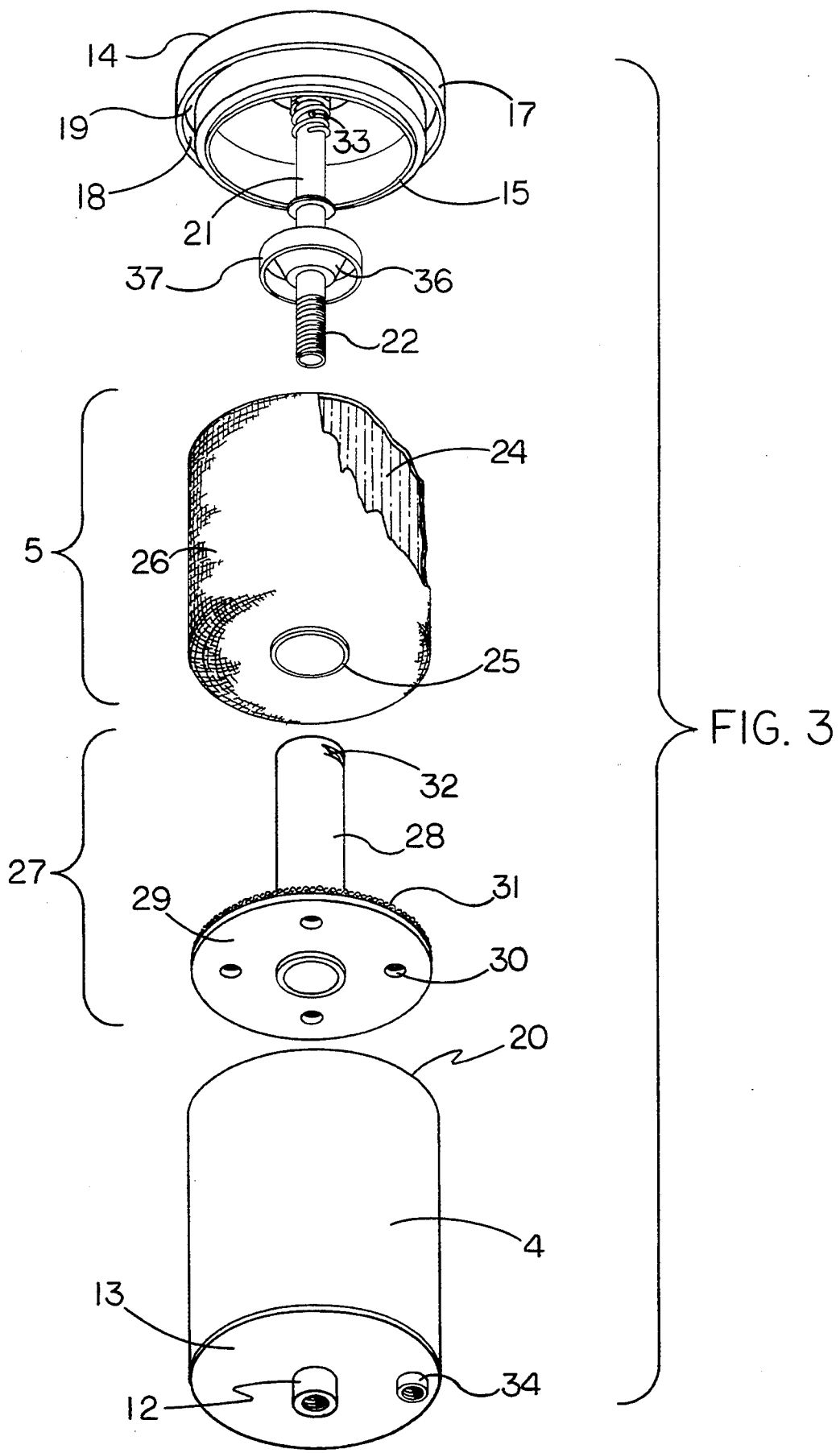
FIG. 3 is an exploded perspective view of the filtering canister illustrating its major component parts.

The filtering cartridge 5 of the present invention is illustrated in exploded detail in FIG. 3 being comprised of a hollow tubular core 25 around which is a tightly wrapped coil of a continuous sheet of fibrous cellulose element 24 resembling somewhat a roll of common toilet tissue with an exception that said coiled fibrous element 24 is encapsulated within a sock 26 preferably of cotton and not unlike a common white athletic sock available at most clothing stores. It is this cartridge configuration which is believed should be further distinguished from other known filtering cartridges because said sock 26 enclosure provides support for the element 24 under high pressure when in use, while also giving said cartridge 5 rigidity and strength during installation and removal from the canister spindle 27.

The canister spindle 27, also illustrated in detail in FIG. 3, can be structurally described as a framework consisting of a circular base plate 29 with central bore extending upwardly and perpendicularly therefrom by a hollow cylindrical shaft 28 for co-axial and contiguous mounting into said core 25 of a filtering cartridge 5. A wire screen 31 is positioned upon said the base plate 29 to provide for axial drainage of clean liquid from the bottom of said cartridge 5 and through a plurality of apertures 30 in said plate 29 when the cartridge is installed and in use. A notch 32 in the shaft may be used for easy removal by the human fingers the spindle 27 with dirty cartridge attached for subsequent separation of the cartridge for disposal preferably by burning.

Referring once again to FIG. 2, in a cross-sectional view of the canister 4, is can be seen that the spindle's base plate 29 is slightly elevated above the canister's base plate 13 by an annular washer 23 thereby providing a space above said base plate 13 for receiving clean liquid from spindle apertures 30 and drainage therefrom through an exit port 34 for return by way of a flexible conduit return hose 35 to a machinery reservoir 8 (see FIG. 1). A frustro-conical collar 36 with annular shoulder 37 is biased by a compression spring 38 against the top of the cartridge 5 thereby providing both a seal and lateral support for positioning the cartridge 5 while in the canister 4.

Having described my invention in detail, I claim:

1. In an improved apparatus for remotely filtering contaminated liquids from machinery reservoirs by recycling, wherein the improvement comprises:
   A. a generally cylindrical filtering canister having a top rim, bottom base plate, removable circular lid, filtering cartridge and support means for the filtering cartridge,
      I. said base plate having,
         a. an inlet means for receiving contaminated liquids from a machinery reservoir,
         b. an outlet means for discharging filtered liquids into a machinery reservoir;
      II. said lid having,
         a. a hollow dome-shaped interior,
         b. an annular depending skirt that fits into the interior of the canister to abut an inner wall,
         c. a planar circumferential shoulder defining a groove between said skirt and shoulder for retaining a gasket to provide a seal between said lid and rim of the canister,
         d. a hollow intake tube attached stationarily to the interior center of the lid and projecting downward perpendicularly therefrom for threaded attachment with the inlet means of the base plate to provide fluid communication between the inlet means and hollow interior dome of the lid, said tube also having,
            i. a means for filling the hollow dome-shaped interior of the lid with contaminated liquid comprising an inlet orifice in said tube located above the filter cartridge,
            ii. a means for fastening the lid to the rim of the canister,
            iii. a means for positioning a filtering cartridge in the canister;
      III. said filtering cartridge having,
         a. a hollow tubular core around which is tightly coiled a continuous filter comprising a sheet of fibrous cellulose element,
         b. an encapsulation means comprising a cotton sock for holding said coiled filter element together;
      IV. a support means for the cartridge while in the canister;
   B. a support stand upon which said filtering canister is mounted;
   C. a pump mounted on said stand, means defining first and second flexible conduits with said first flexible conduit attached to the pump at its inlet and said second flexible conduit connected to the outlet means of said base plate and means connecting the pump outlet to the base plate inlet means.

2. The apparatus of claim 1 wherein the support means for the cartridge is a spindle.

3. The apparatus of claim 1 wherein the means for positioning the filtering cartridge in the canister is a frustro-conical collar co-axially biased upon the intake tube of the lid against the cartridge core.

* * * * *